(12) United States Patent
Kim et al.

(10) Patent No.: US 11,982,949 B2
(45) Date of Patent: May 14, 2024

(54) CHARGING MEMBER HAVING A SURFACE LAYER COMPRISING URETHANE FOAM

(71) Applicant: Hewlett-Packard Development Company, L.P., Spring, TX (US)

(72) Inventors: Taehyun Kim, Seongnam Si (KR); Norihiro Harada, Suwon (KR); Jinmo Hong, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/790,276

(22) PCT Filed: Dec. 18, 2020

(86) PCT No.: PCT/US2020/066165
§ 371 (c)(1),
(2) Date: Jun. 30, 2022

(87) PCT Pub. No.: WO2021/141761
PCT Pub. Date: Jul. 15, 2021

(65) Prior Publication Data
US 2023/0113423 A1   Apr. 13, 2023

(30) Foreign Application Priority Data

Jan. 10, 2020   (KR) .......... 10-2020-0003811

(51) Int. Cl.
*G03G 15/02*   (2006.01)
*B32B 1/08*   (2006.01)
(Continued)

(52) U.S. Cl.
CPC ........... *G03G 15/0233* (2013.01); *B32B 1/08* (2013.01); *B32B 5/18* (2013.01); *B32B 15/046* (2013.01);
(Continued)

(58) Field of Classification Search
CPC .... G03G 15/0233; G03G 15/025; B32B 1/08; B32B 5/18; B32B 15/046; B32B 15/06; B32B 15/08; B32B 15/18; B32B 25/045; B32B 27/065; B32B 2255/06; B32B 2255/10; B32B 2266/0278; B32B 2266/06; B32B 2307/202; B32B 2307/724;
(Continued)

(56) References Cited

U.S. PATENT DOCUMENTS 10,754,272 B1 *   8/2020   Nonaka ............... G03G 15/0233
2002/0197082 A1   12/2002   Hosokawa et al.
(Continued)

FOREIGN PATENT DOCUMENTS

EP   2151719 A1 *   2/2010   ......... G03G 15/0233
JP   1993341627   12/1993
(Continued)

*Primary Examiner* — Sophia S Chen
(74) *Attorney, Agent, or Firm* — Brooks, Cameron & Huebsch, PLLC

(57) ABSTRACT

A charging member for an image forming apparatus may include a conductive support and a surface layer on the conductive support and spaced apart from a photosensitive member. The surface layer may include a urethane foam including foam cells and having a foam structure based on the foam cells, the foam cells including open cells.

15 Claims, 6 Drawing Sheets

(51) Int. Cl.
  *B32B 5/18* (2006.01)
  *B32B 15/04* (2006.01)
  *C08J 9/00* (2006.01)
  *B32B 15/06* (2006.01)
  *B32B 15/08* (2006.01)
  *B32B 15/18* (2006.01)
  *B32B 25/04* (2006.01)
  *B32B 27/06* (2006.01)

(52) U.S. Cl.
  CPC .................. *C08J 9/00* (2013.01); *B32B 15/06* (2013.01); *B32B 15/08* (2013.01); *B32B 15/18* (2013.01); *B32B 25/045* (2013.01); *B32B 27/065* (2013.01); *B32B 2255/06* (2013.01); *B32B 2255/10* (2013.01); *B32B 2266/0278* (2013.01); *B32B 2266/06* (2013.01); *B32B 2307/202* (2013.01); *B32B 2307/724* (2013.01); *B32B 2457/00* (2013.01); *C08J 2205/044* (2013.01); *C08J 2205/05* (2013.01); *C08J 2375/04* (2013.01)

(58) Field of Classification Search
  CPC ... B32B 2457/00; C08J 9/00; C08J 2205/044; C08J 2205/05; C08J 2375/04
  See application file for complete search history.

(56) References Cited

U.S. PATENT DOCUMENTS

| | | |
|---|---|---|
| 2008/0280125 A1 | 11/2008 | Denton et al. |
| 2012/0141177 A1 | 6/2012 | Urayama et al. |
| 2015/0125183 A1* | 5/2015 | Rokutan ............ G03G 15/0233 399/176 |

FOREIGN PATENT DOCUMENTS

| | | | |
|---|---|---|---|
| JP | 1995271144 | | 10/1995 |
| JP | 1998207248 | | 8/1998 |
| JP | 2007-293121 | A | 11/2007 |
| JP | 2008026399 | A | 2/2008 |
| JP | JC2008276026 | | 11/2008 |
| JP | 2009151144 | | 7/2009 |
| JP | 2011-240587 | A | 12/2011 |
| JP | 2013-200501 | A | 10/2013 |
| JP | JC2016188999 | A | 11/2016 |
| KR | 10-2007-0072476 | A | 7/2007 |
| KR | 1020110074603 | | 6/2011 |
| WO | WO-2019066186 A1 * | 4/2019 | ......... G03G 15/0233 |

* cited by examiner

CHARGING MEMBER HAVING A SURFACE LAYER COMPRISING URETHANE FOAM

CROSS REFERENCE TO RELATED APPLICATIONS

This application is being filed as a PCT International Application at the U.S. Patent and Trademark Office (USPTO) and claims the priority benefit of Korean Patent Application No. 10-2020-0003811, which was filed on Jan. 10, 2020 at the Korean Intellectual Property Office (KIPO). The disclosure of the Korean Patent Application No. 10-2020-0003811 is incorporated by reference herein in its entirety.

BACKGROUND

In general, an image forming apparatus using an electrophotographic method supplies toner to an electrostatic latent image formed on the photosensitive member to form a visible toner image on the photosensitive member, transfers the toner image onto a recording medium, and then fixes the transferred toner image on the recording medium to print an image on the recording medium.

Such an electrophotographic image forming apparatus includes a cartridge. The cartridge may contain toner and may include a photosensitive member on which an electrostatic latent image is formed, a charging member for charging an object to be charged such as a photosensitive member, a developing member for supplying toner to an electrostatic latent image formed on the photosensitive member, and the like.

BRIEF DESCRIPTION OF THE DRAWINGS

Various examples of the disclosure will be described with reference to the following drawings.

DETAILED DESCRIPTION

Figure 1:
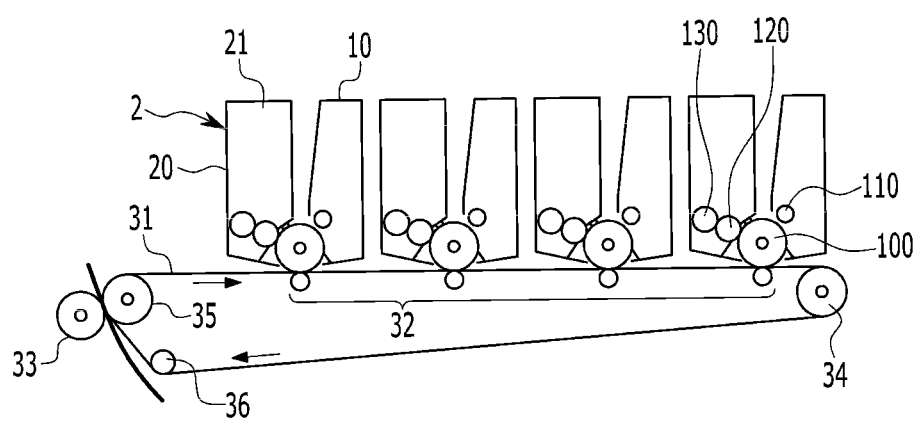
FIG. 1 is a view illustrating an image forming apparatus according to an example.

Hereinafter, a charging member, a cartridge including the same, and an image forming apparatus according to an example of the disclosure will be described. As those skilled in the art would realize, the disclosure according to an example may be modified in various different ways, without departing from the spirit or scope of the disclosure.

In the disclosure, a disclosure that may be understood by those skilled in the art may be omitted, and duplicate descriptions may be omitted, for example, by assigning the same reference numerals to the same or similar elements throughout the specification.

In addition, sizes and thicknesses of each component shown in the drawings are arbitrarily shown for convenience of description, and therefore, the disclosure may not be limited to those shown in the drawings, which may be shown by enlarging the thicknesses in order to clearly express various parts and regions.

FIG. 1 is an illustration of an electrophotographic image forming apparatus according to an example. The image forming apparatus of this example prints a color image on a recording medium by an electrophotographic method.

Referring to FIG. 1, the image forming apparatus may include a plurality of cartridges 2 that are detachably mounted.

Each cartridge 2 may include a photosensitive unit 10 and a developing unit 20. The developing unit 20 of the cartridge 2 includes a toner container 21. The cartridge 2 includes four cartridges 2 for developing an image of, for example, cyan (C), magenta (M), yellow (Y), and black (K) colors. The toner container 21 of each cartridge may include a developer of each color, which may be a toner. However, the disclosure is not limited thereto, and, for example, in addition to the aforementioned colors, a cartridge 2 for containing and developing toners of various colors such as light magenta and white may be further provided.

The developing unit 20 of the cartridge 2 also supplies the toner contained in the toner container 21 to the electrostatic latent image formed on a photosensitive member 100 to develop the electrostatic latent image into a visible toner image. A developing member 120 supplies toner to the photosensitive member 100. A developing bias voltage for supplying the toner to the photosensitive member 100 may be applied to the developing member 120. A supply member 130 supplies the toner in the toner container 21 to the surface of the developing member 120. For this purpose, a supply bias voltage may be applied to the supply member 130.

The photosensitive unit 10 includes the photosensitive member 100. The photosensitive member 100 may have an electrostatic latent image formed on a surface thereof, and may include, for example, a conductive metal pipe and a photosensitive layer formed on an outer circumference thereof. The photosensitive member 100 is uniformly charged by the charging member 110 to which a voltage from a charging bias power source is applied while being rotated. An electrostatic latent image is then formed on the surface of the photosensitive member 100 by exposure.

The charging member 110 is configured to charge the photosensitive member 100 so as to have a uniform surface potential. As the charging member 110, for example, a charging roller or the like may be employed.

Although not shown in the drawing, the image forming apparatus may include an exposer. Light that is modulated corresponding to the image information is irradiated to the photosensitive member 100 to form an electrostatic latent image on the photosensitive member 100.

The image forming apparatus may also include a transfer machine. The transfer machine may include an intermediate transfer belt 31, a primary transfer roller 32, and a secondary transfer roller 33. The toner image developed on the photosensitive member 100 of each cartridge 2 is temporarily transferred to the intermediate transfer belt 31 that is supported by support rollers 34, 35, and 36 to be circulated. The primary transfer roller 32 is disposed at a position facing the photosensitive member 100 of each cartridge 2 with the intermediate transfer belt 31 interposed therebetween. A primary transfer bias voltage is applied to the primary transfer roller 32 so as to primarily transfer the toner image developed on the photosensitive member 100 to the intermediate transfer belt 31. The secondary transfer roller 33 is disposed to face the intermediate transfer belt 31, and a secondary transfer bias voltage is applied to the secondary transfer roller 33 so as to transfer the toner image that is primarily transferred to the intermediate transfer belt 31 onto the recording medium.

When a print command is received from a host (not shown), a control unit (not shown) charges the surface of the photosensitive member 100 to a uniform potential, using the charging member 110. The exposer forms an electrostatic latent image on the photosensitive member 100 by scanning a light beam that is modulated in correspondence with the image information of each color to the photosensitive member 100 of the cartridge 2. The developing member 120 of a developing cartridge 2 supplies toner to the corresponding photosensitive member 100 to develop the electrostatic latent image into a visible toner image. The developed toner images are primarily transferred to the intermediate transfer belt 31. The recording medium is transferred to a transfer nip formed by the secondary transfer roller 33 and the intermediate transfer belt 31, and the toner images that are primarily transferred on the intermediate transfer belt 31 are secondarily transferred onto the recording medium by the secondary transfer bias voltage applied to the secondary transfer roller 33. Then, the toner images are fixed to the recording medium by heat and pressure.

A contact charging method has been adopted as a means for charging the photosensitive member. The charging member used in the contact charging method came into direct contact with the photosensitive member to charge the photosensitive member. When the photosensitive member and the charging member directly contact each other, contamination of toner residues may accumulate on the charging member due to the formation of an electrophotographic image for a long time, which may cause staining on the electrophotographic image. That is, if the charging member and the photosensitive member are used for a long time while they are in contact with each other, charging non-uniformity occurs due to surface contamination of the charging member, and poor image quality occurs. On the other hand, a charging member which is not in contact with the photosensitive member may suppress physical adhesion of the toner and external additives.

Over years, as a resolution of an electrophotographic image increases, a charging voltage to be applied between a charging member and an object to be charged tends to be increased. That is, when the charging voltage is increased, a developing contrast may be increased, and as a result, a method of increasing a gradation of color may be considered. However, when the charging voltage is increased, an amount of discharge charges also increases, so that the amount of discharge charges may be locally increased in the resistance unevenness in the charging member, and abnormal discharge may occur, resulting in discolored images.

In addition, in a high temperature and high humidity environment, vibrations of oxygen molecules and nitrogen molecules in the air become active, so that an amount of discharge charges may be increased, and a discolored image resulting from abnormal discharge may greatly occur. In addition, even under low-temperature and low-humidity environments, abnormal discharges are particularly likely to occur.

Furthermore, suppression of the electrostatic adhesion of the toner and external additives to the surface of the charging member can still be further suppressed. That is, ions having a polarity that is opposite to a polarity of the charging voltage are adhered to the surface of the charging member and the substance adhered to the surface due to discharge. As a result, an electrostatic adhesion force is increased with discharge. In particular, under low-temperature and low-humidity environments, charges of dust are not easily offset by water in the air. Thus, the toner and the external additives are more likely to adhere to the surface of the charging member.

For example, in the case of negative charging, the charging member is connected to a power source and is opposed to a photosensitive member connected to ground. The discharge is generated in a gap between the charging member and the photosensitive member, and along an electric field, electrons having negative polarity are attracted to the photosensitive member and ions having positive polarity are attracted to the surface of the charging member.

In this case, when dust such as a toner is present on the surface of the charging member, ions having a positive polarity that are attracted to the charging member are adhered to the dust, and the dust is positively charged. As a result, an electrostatic attractive force between the dust and the negatively charged charging member is increased, and the dust is strongly adhered to the surface of the charging member. In addition, this phenomenon occurs repeatedly with the progress of use, thereby increasing an adhesion force of the dust.

Further, according to Paschen's law, a discharge is generated from the charging member to the object to be charged. In addition, the discharge phenomenon may be explained as a diffusion phenomenon of an electron avalanche in which ionized electrons are exponentially increased by colliding with molecules and electrodes in the air and by repeating a process of generating electrons and cations. The electron avalanche spreads along the electric field, and an extent of this diffusion determines a final amount of discharge charges.

In addition, abnormal discharge occurs when an excessive voltage is applied according to Paschen's law, and the electron avalanche is considerably diffused to generate a very large amount of discharge charges. In practice, the abnormal discharge may be observed with a high speed camera and an image multiplier, and has a size of about 200 μm to about 700 μm. An amount of discharge current is measured to be about 100 times or more than an amount of discharge current of normal discharge. Therefore, in order to suppress abnormal discharge, it is sufficient that the amount of discharge charges generated by a spread of the electron avalanche is controlled within a normal range under conditions of a large applied voltage.

Therefore, it is possible to stably charge the object to be charged such as the photosensitive member 100, and to exhibit uniform image quality even when used for a long time without depending on environments such as high temperature/high humidity or low temperature/low humidity, and to prevent poor image quality. Even when the charging voltage is increased, a charging member that may effectively suppress electrostatic adhesion of dust such as a toner to the surface of the charging member without causing abnormal discharge has been studied.

The charging member 110 according to the example of the disclosure is a charging member 110 which is not in contact with the photosensitive member 100. That is, the charging member 110 is spaced apart from the photosensitive member 100 at a predetermined interval, and a non-contact charging method is adopted in which the charging member 110 and the photosensitive member 100 do not directly contact each other. As a result, contamination of the charging member 110 may be prevented, and a charging member 110 having long life-span may be provided. The charging member 110 may be an electrophotographic charging member 110.

Figure 2:
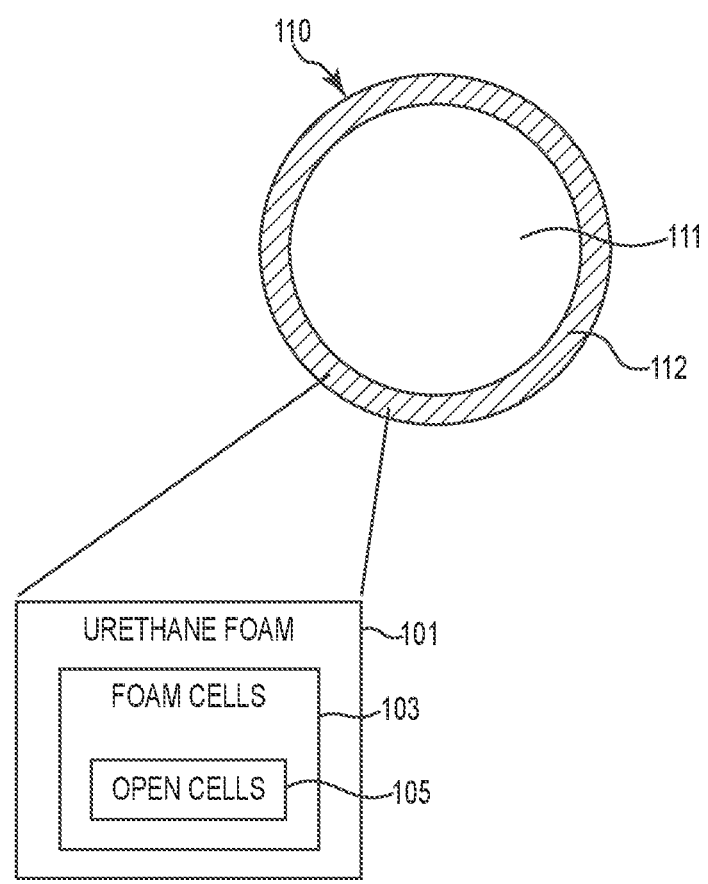
FIG. 2 is a cross-sectional view illustrating a charging member according to an example.

FIG. 2 shows a charging member according to an example of the disclosure, which may be an electrophotographic charging member. Referring to FIG. 2, the charging member 110 according to an example of the disclosure may be an electrophotographic charging member 110 in non-contact with a photosensitive member 100, and may include a conductive support 111 and a surface layer 112 on the conductive support 111, wherein the surface layer 112 includes a urethane foam 101 having a foam structure having foam cells 103 including open cells 105.

When the charging member 110 is disposed to be spaced apart from the photosensitive member 100 in a non-contact manner, uniform charging may be difficult. Herein, as the charging member 110 has the surface layer 112 including the urethane foam 101, a charging member 110 exhibiting uniform image quality may be obtained even if used for a long time without depending on the environment such as high temperature/high humidity or low temperature/low humidity.

In the urethane foam 101 of the surface layer 112, a uniform gap is formed between cells, and discharge is performed using the gap as a connection passage, thereby preventing charging non-uniformity against abnormal discharge. For example, in the case of another resin or rubber foam, it is difficult to have a uniform cell size, the cell size is irregular, and it is difficult to increase a ratio of open cells 105 to 50% or more. However, the urethane foam 101 can have a more uniform cell size and it is easy to adjust the average cell size and the ratio of the open cells 105. That is, the urethane foam 101 may have a more uniform cell size and may have a high proportion of open cells 105. For example, about 40% to about 99% based on the total number of cells of the urethane foam 101 may be open cells 105.

The urethane foam 101 of the surface layer 112 may have a thickness of less than or equal to about 20 mm. The urethane foam 101 of the surface layer 112 may have a thickness of less than or equal to about 10 mm, for example, less than or equal to about 5 mm.

The thickness of the surface layer 112 is a thickness measured in the direction perpendicular to the surface of the conductive support 111. This means an average value of the thickness of a total of 25 points obtained by dividing the charging member 110 in the longitudinal direction into 5 substantially equal portions and measuring the thicknesses of the fragments cut at any 5 points of each portion. In addition, the thickness of the surface layer 112 at each point may be measured by cutting the fragment including the conductive support 111 and the surface layer 112 from the charging member 110, and applying the fragment to X-ray CT measurement or the like.

When the thickness of the urethane foam 101 exceeds about 20 mm, a large number of cells may be irregularly disposed, making it difficult to charge through uniform gaps, and charging non-uniformity may occur. Background image and poor fouling may occur, indicating NG (no good) in image quality.

On the other hand, when the thickness of the urethane foam 101 is formed to be less than or equal to about 10 mm, charging uniformity is improved, and further, it is possible to exhibit a reduction effect in terms of contamination defects such as stains and bands formed on the image, or image background and non-uniformity of image density. Furthermore, when the thickness of the urethane foam 101 is formed to be less than or equal to about 5 mm, it is easy for the cells to form a uniform gap and the charging uniformity may be further improved.

A lower limit of the thickness of this urethane foam 101 does not matter. For example, the urethane foam 101 may have a thickness of greater than 0 μm, for example, greater than or equal to about 40 μm or greater than or equal to about 150 μm. However, the lower limit is not limited thereto, and may be a thickness in which a foam cell 103 of the urethane foam 101 can be formed.

The cell size of the urethane foam 101 of the surface layer 112 is less than or equal to about 150 μm. For example, the average cell size of foam cells 103 of the urethane foam 101 of the surface layer 112 may be less than or equal to about 100 μm, for example, less than or equal to about 50 μm.

If the average cell size of the foam cells 103 of the urethane foam 101 exceeds about 150 μm, charging non-uniformity may occur, and image defects such as micro jitter may occur. In addition, there may be slight non-uniformity of image density and poor contamination, which indicates deterioration of image quality.

On the other hand, when the urethane foam 101 is formed to have an average cell size of less than or equal to about 100 μm, charging uniformity becomes more uniform or the effect may be exhibited in terms of contamination defects such as image background and non-uniformity of image density. Furthermore, when the foam cells 103 of the urethane foam 101 is formed to have an average cell size of less than or equal to about 50 μm, charging uniformity may be more uniform.

A lower limit of the average cell size of such urethane foam 101 does not matter. If possible, the smaller cell size of the urethane foam 101 may exhibit more charging uniformity. For example, the urethane foam 101 may have an average cell size of greater than 0 μm, for example, greater than or equal to about 10 μm or greater than or equal to about 30 μm.

On the other hand, as described above, the abnormal discharge has a size of about 200 μm to about 700 μm. This size is a result of a growth of the normal discharge along an electric field in the space. That is, in order to suppress abnormal discharge, it is sufficient to suppress a growth of normal discharge. The normal discharge may be confirmed with a high speed camera and an image multiplier in the same manner as in the abnormal discharge, and its size may be less than or equal to about 30 μm.

When the surface layer includes foam cells 103 of a urethane foam 101 having an average cell size of less than or equal to about 150 μm, it is considered that a spread of the electron avalanche is spatially limited, and that normal discharge may be suppressed from growing to the size of an abnormal discharge. That is, the surface layer includes a cell having few through-holes penetrating through the surface layer in the same direction as the direction of the electric field. Accordingly, a discharge from the surface of the conductive support is separated, and an increase of a size of the normal discharge is considered to be limited.

Air permeability of the urethane foam 101 of the surface layer 112 is about 50 cc/cm2/s to about 200 cc/cm2/s. For example, air permeability of the urethane foam 101 of the surface layer 112 may be about 80 cc/cm2/s to about 200 cc/cm2/s, for example, about 100 cc/cm2/s to about 150 cc/cm2/s. The air permeability of such urethane foam 101 may be controlled by adjusting the average cell sizes of foam cells 103 or the ratios of open cells 105 among the foam cells 103.

If the air permeability of the urethane foam 101 is less than about 50 cc/cm2/s, charging non-uniformity and contamination of the charging member may occur. If the air permeability of the urethane foam 101 is greater than about 200 cc/cm2/s, a concentration deviation may occur due to non-uniform charging.

On the other hand, when the air permeability of the urethane foam 101 is greater than about 80 cc/cm2/s, it indicates that obstacles, such as a closed cell, are reduced and charging uniformity may be more uniform. Furthermore, when the air permeability of the urethane foam 101 is less than about 100 cc/cm2/s, the charging uniformity is more uniform, and it is possible to exhibit a reduction effect in terms of contamination defects such as stains and bands formed on the image, or image background and non-uniformity of image density. In addition, when the air permeability of the urethane foam 101 is less than or equal to about 150 cc/cm2/s, the charging uniformity may be more uniform.

The urethane foam 101 of the surface layer 112 may have foam cells 103 including open cells 105, where a ratio of the open cells 105 is greater than or equal to about 10 volume % and less than or equal to about 70 volume % based on a total volume of the urethane foam 101. For example, the ratio of open cells 105 of the urethane foam 101 of the surface layer 112 to be greater than or equal to about 20 volume % and less than or equal to about 70 volume %, for example, greater than or equal to about 50 volume % and less than or equal to about 60 volume %. It may be more adjustable the ratio of the open cells 105 of the urethane foam 101. Charging characteristics may be controlled by adjusting the ratio of the open cells 105.

If the ratio of open cells 105 in the urethane foam 101 is less than about 10 volume % based on a total volume of the urethane foam 101, charging may be hindered or may be relatively non-uniform. When the ratio of the open cells 105 of the urethane foam 101 is greater than about 70 volume %, abnormal discharge may occur, charging may be relatively non-uniform, and a concentration deviation may occur due to non-uniform charging.

On the other hand, if the ratio of the open cells 105 in the urethane foam 101 is greater than or equal to about 20 volume %, the charging uniformity may be further improved.

Furthermore, when the ratio of the open cells 105 of the urethane foam 101 is greater than or equal to about 50 volume %, it may exhibit air permeability that cannot be formed by other resins or rubber foams, and may exhibit resulting effects. In addition, when the ratio of the open cells 105 of the urethane foam 101 is less than or equal to about 60 volume %, abnormal discharge may be further suppressed, and charging uniformity may be more uniform.

Figure 3:
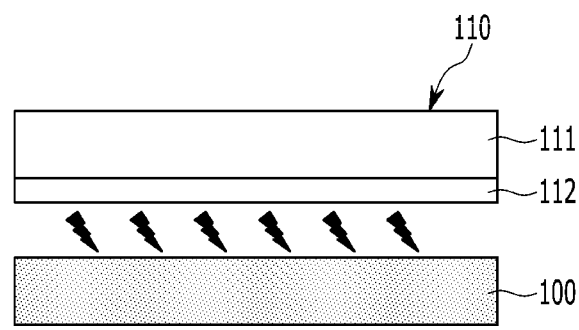
FIG. 3 is an enlarged view of a charging member and a photosensitive member according to an example.

FIG. 3 is an enlarged view of a charging member and a photosensitive member according to an example. Referring to FIG. 3, the photosensitive member 100 and the charging member 110 are spaced apart from each other, and the photosensitive member 100 may be charged through the surface layer 112 of the charging member 110.

Suppression of adhesion of dust is described as follows. Due to physical adhesion or electrostatic attraction, dust may adhere to the surface of the charging member. In particular, the dust induced on the charging member has a distribution from a positive charge to a negative charge, and thus electrostatic adhesion of the dust cannot be avoided. In addition, as described above, in a charging member for contact, ions having a polarity that is opposite to the polarity of the applied voltage are adhered to the surface of the charging member and the substance adhered to the surface due to the discharge. Thus, the electrostatic adhesion force increases with the discharge, and dust, once adhered to the surface, is not easily peeled off.

In the charging member 110 according to an example, both physical adhesion and electrostatic adhesion of dust as described above may be suppressed. First, physical adhesion is described. The surface layer 112 is a urethane foam having a foam structure having foam cells including open cells, and is spaced apart from the photosensitive member 100 to reduce contact points and prevent physical adhesion of dust.

When the surface layer 112 of the charging member 110 includes a urethane foam having a foam structure based on foam cells including open cells, discharge generated between the surface layer 112 and the object to be charged such as the photosensitive member 100 is also generated continuously on the surface layer 112. Herein, the discharge generated between the surface layer 112 and the photosensitive member 100 charges the surface layer 112 with cations or electrons. The charging polarity of the surface layer 112 has the opposite polarity to the applied bias of the charging member, so that the electric field in the surface layer 112 may be increased and the electric field between the surface layer 112 and the photoreceptor 100 may be decreased.

For example, in the case of negative charging, when discharge is generated, negative charges move to the surface of the photosensitive member 100 and charges having positive polarity move to the surface layer 112 of the charging member 110, along the electric field. Herein, the surface layer 112 includes a urethane foam and is non-conductive, and accordingly the surface layer 112 captures charges having a positive polarity and is positively charged. In this case, the surface layer 112 electrostatically repels the positively charged dust that is adhered to the surface of the charging member 110 due to the electric field, thereby reducing an electrostatic attractive force acting on the dust. That is, electrostatic adhesion that cannot be suppressed in the related art may be reduced.

In addition, even when dust adheres to the surface of the surface layer 112, a large amount of negative discharge charges generated on the surface layer 112 adhere to the dust because the surface layer 112 has a foam structure including open cells. As a result, the dust has negatively charged polarity. Accordingly, the polarity is reversed, and the dust is peeled off due to the electric field.

That is, both physical adhesion and electrostatic adhesion of dust may be effectively suppressed at the same time, thereby reducing image defects caused by adhesion of dust.

Therefore, both suppression of abnormal discharge and suppression of image defects caused by adhesion of dust may be realized. In addition, a cartridge and an image forming apparatus capable of suppressing void images over a long period of time and suppressing image defects caused by adhesion of dust may be provided.

Figure 4A:
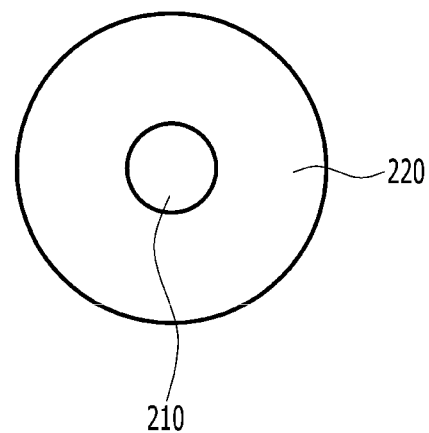
FIGS. 4A to 4C are cross-sectional views illustrating a conductive support of a charging member according to an example.
Figure 4B:
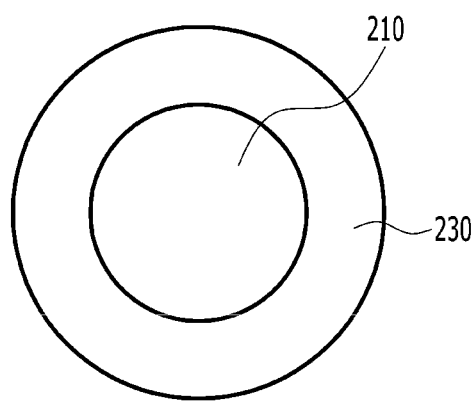
Figure 4C:
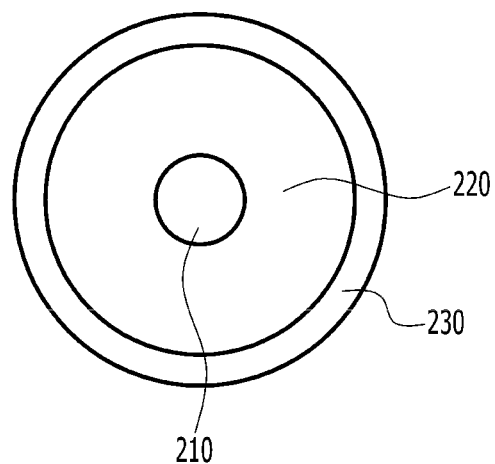

On the other hand, the charging member 110 includes a conductive support 111. FIGS. 4A to 4C are cross-sectional views illustrating a conductive support of a charging member according to an example.

The conductive support 111 may be formed of a metal shaft 210 serving as a conductive mandrel. In addition, the conductive support 111 may be configured to have a metal shaft 210 serving as a conductive mandrel and at least one resin layer formed on the outer periphery of the metal shaft 210.

For example, referring to FIG. 4A, the conductive support 111 may include a metal shaft 210 and an elastic body 220 disposed on the metal shaft 210. Referring to FIG. 4B, the conductive support 111 may include a metal shaft 210 and a coating layer 230 disposed on the metal shaft 210. Referring to FIG. 4C, the conductive support 111 may include a metal shaft 210, an elastic body 220 disposed on the metal shaft 210, and a coating layer 230 disposed on the elastic body 220.

The metal shaft 210 may have a core-type rod shape that serves as a conductive mandrel. For example, the metal shaft 210 may be a cylindrical material. However, the disclosure is not limited thereto, and the metal shaft 210 may have a cored rod shape having a convex portion on the surface thereof. Herein, the convex portion may be formed on the surface of the cored rod by sandblasting, laser processing, polishing, or the like.

The metal shaft 210 may be appropriately selected from materials for electrophotographic charging members. For example, the metal shaft 210 may be a carbon steel alloy whose surface is plated with nickel and other materials having a thickness of about 5 µm. When a portion of energy at the time of discharge is converted into thermal energy, the metal shaft 210 may be formed of a metal having high thermal conductivity and thus easily dissipates thermal energy, reduces damage to the charging member, and increases durability.

The elastic body 220 may be conductive or semi-conductive. For example, the elastic body may be formed of a rubber material, a resin material, or other materials for forming an elastic body.

The rubber material is not particularly limited, and a rubber for electrophotographic charging members may be used. Specific examples thereof include an epichlorohydrin homopolymer, an epichlorohydrin-ethylene oxide copolymer, an epichlorohydrin-ethylene oxide-allyl glycidyl ether terpolymer, an acrylonitrile-butadiene copolymer (NBR), a hydrogenated product of an acrylonitrile-butadiene copolymer, a silicone rubber, an acrylic rubber, and a urethane rubber. One type of these materials may be used alone, or two or more types thereof may be used in combination.

In addition, resins known in the field of electrophotographic charging members may be used as the resin material. Specific examples thereof may include an acrylic resin, a polyurethane resin, a polyamide resin, a polyester resin, a polyolefin resin, an epoxy resin, and a silicone resin. One type of these materials may be used alone, or two or more types thereof may be used in combination.

A volume resistivity of the elastic body 220 may be greater than or equal to about $1 \times 10^3$ Ω·cm and less than or equal to about $1 \times 10^9$ Ω·cm. In addition, the surface layer may suppress occurrence of image defects due to excessive discharges, even when an electrical resistance value of the conductive support is sufficiently low.

In order to adjust the electrical resistance value of the elastic body 220, carbon black, graphite, an oxide such as tin oxide, and a metal such as copper and silver, which show electron conductivity; a conductive particle to which electroconductivity is imparted by covering the surface of the particle with an oxide or a metal, respectively; or an ion conductive agent each one having ion exchange performance such as a quaternary ammonium salt and a sulfonate exhibiting ion conductivity may be mixed with the rubber material or the resin material for forming the elastic body 220.

In addition, fillers, softeners, processing aids, tackifiers, anti-sticking agents, dispersing agents, foaming agents, refining particles, or the like which are generally used as a mixing agent may be added to the rubber or resin as long as they do not impair the effects of the disclosure. One type of these agents may be used alone, or two or more types thereof may be used in combination.

As a material for forming the elastic body 220, an electron-conductive resin using a conductive agent such as carbon black may be used, which may reduce a phenomenon that charging of the surface layer 112 is released to the conductive support. In the case where the conductive agent such as carbon black is used, volume resistivity is extremely low and charges are released to the conductive support, thereby reducing the effect of the disclosure. Therefore, the number of parts of the conductive agent added to the conductive support may be reduced within a range that does not limit the effects of the disclosure.

In addition, when a conductive support having ion conductivity is used, conductive points on the surface of the conductive support are uniformly present over the entire surface, whereby a phenomenon in which charges of the surface layer are released begins to greatly occur and consequently an effect of suppressing adhesion of dust may be reduced.

The coating layer 230 may be conductive or semi-conductive. For example, the coating layer 230 may be a plastic compound in which conductivity is formed by dispersing carbon black, a metal, a conductive metal oxide, a conductive polymer, or the like. The plastic may be polyethylene, polypropylene, polyvinyl chloride, polyvinylidene chloride, polyamide, polyimide, polycarbonate, polystyrene, ABS, polyurethane, NBR/ECO, and the like.

In addition, the coating layer 230 may serve as an intermediate layer disposed between the metal shaft 210 and the surface layer 112. When energy by discharge is applied to the charging member, accumulated charges leak from the surface layer to the conductive support due to oxidation or by-products, and discharge stability and an effect of suppressing contamination adhesion may be reduced.

Accordingly, by providing the non-conductive intermediate layer including the radiation decay resin as the coating layer 230, leakage of accumulated charge from the surface layer to the conductive support may be suppressed for a long time.

Since an influence of the discharge reaches the bottom end of the coating layer 230 of the surface layer, the surface of the coating layer 230 is exposed to the discharge. Herein, when the coating layer 230 is non-conductive and includes a radiation decay resin that may suppress oxidation and generation of by-products by discharge, high resistance may be maintained and leakage of accumulated charges may be blocked even if a resistance value of the surface layer decreases.

That is, it possible to suppress the leakage of the charges accumulated in the surface layer, and thereby discharge stability and an effect of suppressing contamination adhesion may be maintained for a long time.

In addition, by optimizing volume resistivity of the coating layer 230, the coating layer 230 may also be charged. As a result, the charging amount may be improved as the charging member, and discharge stability and the effect of suppressing contamination adhesion are obtained.

The coating layer 230 may have non-conductivity so as to suppress the accumulated charges from leaking to the metal shaft 210 or the elastic body 220. Herein, non-conductivity indicates that volume resistivity is greater than or equal to about $1 \times 10^{10}$ Ω·cm. For example, the coating layer 230 may have volume resistivity of greater than or equal to about $1 \times 10^{12}$ Ω·cm and less than or equal to about $1 \times 10^{17}$ Ω·cm. When the volume resistivity is greater than or equal to about $1 \times 10^{12}$ Ω·cm, leakage of charges accumulated in the surface layer may be sufficiently suppressed. In addition, when the volume resistivity is less than or equal to about $1 \times 10^{17}$ Ω·cm, charge supply for discharge in the cell of the surface layer may be sufficiently performed. In addition, when the volume resistivity is greater than or equal to about $1 \times 10^{15}$ Ω·cm and less than or equal to about $1 \times 10^{17}$ Ω·cm, charging of the coating layer 230 itself becomes large. Since the coating layer 230 is integrated, when the charging is improved, a deviation thereof may be reduced, and the effect of suppressing contamination adhesion may be uniform.

Non-conductive evaluation of the coating layer 230 may be performed by the following method. Volume resistivity of the coating layer 230 is measured in a contact mode using a scanning probe microscope (SPM). More specifically, a specimen including the coating layer 230 is produced by a converging ion beam method in the charging member. The specimen is then installed on a metal plate made of stainless steel to obtain a measurement fragment. A portion that is in direct contact with the metal plate is selected, is contacted with a cantilever of the SPM, a voltage of 50 V is applied to the cantilever, and a current value is measured. The volume resistivity from the thickness and current value of the measured portions of the specimen are calculated. The charging member is divided into 10 substantially equal portions in the length direction, the above measurement is carried out at 10 points in total, by one point in each region, and an average value is determined to be the volume resistivity of the coating layer 230. The volume resistivity of the coating layer 230 after durability evaluation may also be measured similarly to the above measurement.

As described above, the coating layer 230 may be non-conductive and include a radiation decay resin. If the coating layer 230 includes a radiation decay resin and is non-conductive, it is possible to block leakage of accumulated charges between the surface layer and the conductive support because it does not reduce resistance even when discharged. As a result, it is possible to maintain an effect of long-term suppression of contamination adhesion.

The radiation decay resin may be, for example, radiation decay resins described in pages 89 to 91 of Kenichi Shinohara et al., "Radiation and Polymer" (Maki Bookstore, 1968). More specifically, it may be poly-α-methylstyrene, cellulose acetate, and the like. In particular, the radiation decay resin may be an acrylic resin having a structural unit represented by Chemical Formula 1.

[Chemical Formula 1]

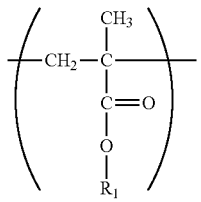

(1)

In Chemical Formula 1, $R_1$ represents a C1 to C6 hydrocarbon group. When $R_1$ is a C1 to C6 hydrocarbon group, there are not too many portions which may be radicalized at the time of discharge, and oxidation and generation of by-products which react with surrounding oxygen or water do not occur easily. The acrylic resin having the structural unit represented by Chemical Formula 1 may be poly(methyl methacrylate), poly(ethyl methacrylate), propyl polymethacrylate, isopropyl polymethacrylate, butyl polymethacrylate, t-butyl polymethacrylate, isobutyl polymethacrylate, cyclohexyl polymethacrylate, and the like.

In addition, the acrylic resin may be a copolymer including a plurality of structural units represented by Chemical Formula 1, or may be a copolymer including other monomer units in addition to the structural units represented by Chemical Formula 1.

The reaction mechanism considered when the repeating unit of the radiation decay resin is represented by Chemical Formula 1 is described using Reaction Scheme (A). In Reaction Scheme (A), n represents the number of repeating units, and a dot represents a radical. When energy is added by discharge, the hydrogen of the methyl group bonded with the polymer backbone which is a main chain is detached, and a radical is generated. This radical generation is likely to occur near the end of the backbone. The generated radicals are very unstable by the electron withdrawing action of the ester bonds. Because of this, the next reaction proceeds, that is, the radical moves to another portion. Herein, the radical moves in a main chain backbone direction under the influence of the ester bond. Molecular cleavage occurs because a bond between the quaternary carbon with which the methyl group is bonded and the carbon adjacent to the main chain backbone direction is broken and the carbon adjacent to the main chain backbone direction is radicalized. After molecular cleavage, a main backbone and a backbone having a shortened molecular chain are produced and a reaction of the main backbone is terminated, and a radical remains in the backbone having the shortened molecular chain. Decomposition proceeds by further reaction in the backbone in which the radical remains, the radical disappears by gasification, and a whole radical reaction is terminated. In other words, since an unstable radical is formed and the reaction is rapidly terminated, a chance of reacting with the surrounding oxygen or water may be further reduced and oxidation may be suppressed.

[Reaction Scheme A]

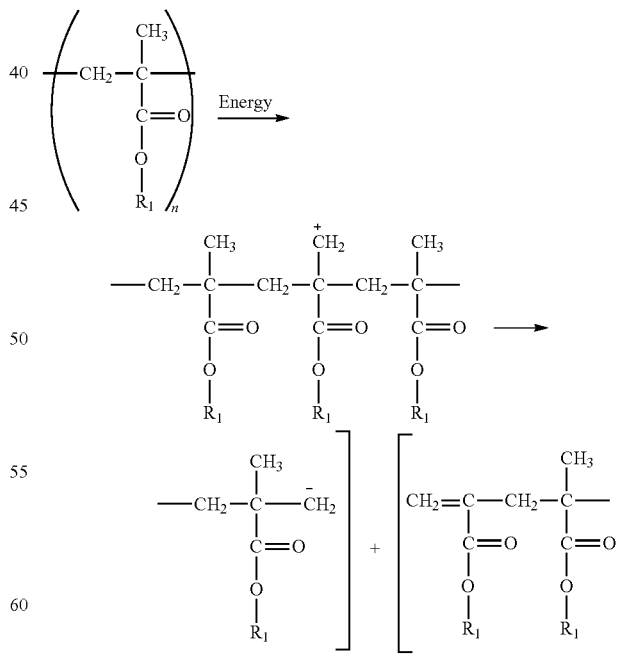

In Chemical Formula 1, $R_1$ may be a C2 to C6 linear or branched alkyl group. Since $R_1$ is not a cyclic structure, stable radical formation due to resonance or the like may be suppressed, multiple carbon increase steric hindrance, and thereby a reaction possibility with a discharged product of this portion may be decreased and oxidation may be suppressed.

In Chemical Formula 1, $R_1$ may be at least one selected from groups represented by Chemical Formula 2 to Chemical Formula 5. When $R_1$ is at least one selected from the groups represented by Chemical Formula 2 to Chemical Formula 5, oxidation may be inhibited by the absence of secondary carbon which tends to become a radical on $R_1$ and by an increase of steric hindrance.

$C(CH_3)_3$ [Chemical Formula 2]

$CH(CH_3)_2$ [Chemical Formula 3]

$CH(CH_3)-C(CH_3)_3$ [Chemical Formula 4]

$C(CH_3)_2-CH(CH_3)_2$ [Chemical Formula 5]

In particular, in Chemical Formula 1, $R_1$ may be $-C(CH_3)_3$. When $R_1$ is $-C(CH_3)_3$, tertiary carbon becomes absent and it is composed of quaternary carbon and primary carbon. Since it is difficult to form a stable radical, discharge deterioration by oxidation is suppressed.

In addition, quaternary carbon means a carbon atom in which all the atoms are bonded with atoms other than a hydrogen atom (specifically a carbon atom, etc.).

A weight average molecular weight of the radiation decay resin may be greater than or equal to about 50,000 and less than or equal to about 2,500,000. In addition, a glass transition temperature (Tg) of the radiation decay resin may be greater than or equal to about −70° C. and less than or equal to about 250° C. Further, the weight average molecular weight is a value measured by gel permeation chromatography (GPC).

Whether it is a radiation decay resin may be determined by measuring a molecular weight change before and after a process which applies radiation or energy equivalent thereto. For example, corona discharge is performed with respect to a resin, and is analyzed by a gel permeation chromatography (GPC). In GPC measurement, a target resin is dissolved in a solvent to prepare a solution. Herein, a solvent which may easily dissolve the target resin may be used, and may be toluene, chlorobenzene, tetrahydrofuran (THF), trifluoro acetic acid, 1,1,1,3,3,3-hexafluoro-2-propanol (HFIP), formic acid, and the like. About 1 wt % or more of the target resin may be dissolved in the solvent to prepare a solution. The GPC of the dissolved target resin is measured using the solution.

When the molecular weight is less than or equal to the molecular weight before corona discharge treatment, the molecular backbone is more broken and is considered to be radiation decay type. On the other hand, when the molecular weight increases, it is determined that it is a radiation cross-linking type.

The coating layer 230 may have a thickness of greater than or equal to about 1 μm and less than or equal to about 5 μm. When the thickness is greater than or equal to about 1 μm, the charge accumulated in the surface layer may be suppressed from leaking to the conductive support, and the effect of suppressing contamination adhesion may be maintained. In addition, since the charge is sufficiently stored when the thickness is less than or equal to about 5 μm, a charging failure due to insufficient discharge amount may be suppressed. Further, the thickness may be greater than or equal to about 1.5 μm and less than or equal to about 4.5 μm, and may be greater than or equal to about 2 μm and less than or equal to about 4 μm.

The film thickness of the coating layer 230 is measured by cutting a sheet which is likely to expose the cross-section of the coating layer 230 with a sharp blade such as a razor, a manipulator, and the like, and then observing this by an optical microscope or an electron microscope. When the maximum value of thickness is A and the minimum value is B, B may be greater than or equal to about 1 μm and A may be less than or equal to about 5 μm. In addition, the charging member is divided into 10 substantially equal portions in the length direction, and the thickness of the coating layer 230 is measured at any one point (of a total of 10 points) of each region, and the average value is determined to be the thickness of the coating layer 230.

The structure of the coating layer 230 is not particularly limited as long as the effect of the disclosure is exhibited. For example, the coating layer 230 may be a solid film or a porous body, but is desirably a solid film. When the coating layer 230 is a solid film, an influence of energy of the discharge may not be likely to reach a portion apart from the surface layer, so that the resistance at a portion close to the conductive support may not be likely to be low, and leakage of accumulated charge to the conductive support may be suppressed.

The coating layer 230 may be formed on the metal shaft 210 or the elastic body 220, for example, by the following methods: a coating method such as a dipping method, a roll coating method, a spray method, an electrostatic coating method, a tube molding method such as extrusion or multicolor molding, an inflation molding method, a blow molding method, a lamination method, and the like, and a combination thereof. For example, the coating layer 230 may be formed by the dipping method in that it may be formed with a thickness of greater than or equal to about 1 micrometer and less than or equal to about 5 micrometers over the whole surface, and it may have a uniform accumulation charge.

Therefore, the charging member 110 may stably charge an object to be charged such as the photosensitive member 100, and exhibits uniform image quality even after long-term use without depending on an environment such as high temperature/high humidity or low temperature/low humidity, and image quality defects may be prevented.

The surface of the elastic body 220 as an elastic layer 220 or the coating layer 230 of the conductive support 111 may be formed in a shape having a convex portion. For example, the elastic body 220 or the coating layer 230 may be formed by sandblasting, laser processing, polishing, or the like. In addition, fillers such as organic particles or inorganic particles may be dispersed in the elastic body 220 or the coating layer 230.

As a material for forming organic particles, for example, a nylon resin, a polyethylene resin, a polypropylene resin, a polyester resin, a polystyrene resin, a polyurethane resin, a styrene-acryl copolymer, a poly(methyl methacrylate) resin, an epoxy resin, a phenolic resin, a melamine resin, a cellulose resin, a polyolefin resin, and a silicone resin may be used. One type of these materials may be used alone, or two or more types thereof may be used in combination.

Moreover, as a material for forming inorganic particles, for example, silica, aluminum oxide, titanium oxide, zinc oxide, calcium carbonate, magnesium carbonate, aluminum silicate, strontium silicate, barium silicate, calcium tungstate, a clay mineral, mica, talc, and kaolin may be used. One type of these materials may be used alone, or two or more types thereof may be used in combination. In addition, both organic particles and inorganic particles may be used.

In addition to the method of forming the conductive support 111 as described above, a convex portion may be introduced independently of the conductive support 111. For example, the conductive support 111 may be wound around a thread-shaped member such as a wire.

In order to protect the surface layer, the density of the convex portion may be set such that when viewed from the direction facing the surface layer, at least a portion of a rigid structure may be observed in a square region measured at 1.0 mm per side surface in the surface layer. As long as the effect of the disclosure is not impaired, there is no limitation on sizes and thicknesses of the convex portion.

More specifically, sizes and thicknesses of the convex portion are included within a range in which image defects are not caused by the presence of the convex portion. There is no limitation on a height of the convex portion as long as the height of the convex portion is higher than the thickness of the surface layer and the effect of the disclosure is not impaired. More specifically, the height of the convex portion is included in a range in which the height of the convex portion is at least greater than the thickness of the surface layer and charge failure is not caused by a large discharge gap.

On the other hand, although not shown in the drawing, a spacer member capable of separating the photosensitive member 100 and the charging member 110 may be disposed. As long as the effect of this disclosure is not impaired, there is no restriction on the space member. For example, the spacer member includes a ring and a spacing body.

For example, in order to introduce the spacer member, when the charging member has a roller shape, a ring having an outer diameter that is larger than an outer diameter of the charging member and having hardness capable of maintaining a gap between the photosensitive member and the charging member may be introduced. Further, as another example of a method of introducing the spacer member, when the charging member has a blade shape, a spacing body capable of separating the surface layer and the photosensitive member from each other may be introduced in order to prevent friction and wearing between the surface layer of the charging member and the photosensitive member.

As long as the effect of the disclosure is not impaired, there is no restriction on the materials for forming a spacer member. In addition, it is sufficient to properly use non-conductive materials in order to prevent conduction through the spacer member. Materials for the spacer member may include polymer materials having improved sliding properties, such as polyacetal resins, high molecular weight polyethylene resins, and nylon resins, and metal oxide materials such as titanium oxide and aluminum oxide. One type of these materials may be used alone, or two or more types thereof may be used in combination.

As long as the effect of the disclosure is not impaired, there is no restriction on a position at which the spacer member is introduced, and for example, it is sufficient that the spacer member is set at the end in the longitudinal direction of the conductive support. A cartridge according to another aspect of the disclosure is a cartridge that is detachable from an image forming apparatus, including: a charging member according to one aspect of the disclosure; and a photosensitive member, wherein the charging member and the photosensitive member are not in contact with each other.

An image forming apparatus according to one aspect of the disclosure is an image forming apparatus employing the charging member according to the above aspect of the disclosure.

Hereinafter, the disclosure will be described in more detail with reference to examples and comparative examples, but the disclosure is not limited thereto.

Examples 1 to 4 and Comparative Examples 1 to 4

Urethane foams respectively having a thickness, an average cell size of foam cells, and air permeability shown in Table 1 were respectively formed on a conductive support to manufacture charging members. Cell sizes of foam cells in the urethane foam were measured with 50 times magnification by using a SEM (scanning electron microscope S-3000H, HITACHI Ltd.). The cell sizes as the average cell sizes of Table 1 were obtained by obtaining 10 measurements with 50 times magnification and calculating an average. The air permeability of the urethane foams in Table 1 was obtained by using a cylindrical cylinder having a 10 mm-sized hole in the center and a 20 mm-thick ring inserted therein, respectively putting the charging members on the cylinder, reducing a pressure down to 1 kPa, and reading air permeability with an air flow meter.

TABLE 1

|  | Foam thickness (mm) | Cell size (μm) | Air permeability (cc/cm$^2$/sec) | Charging uniformity (micro jitter) | Non-uniformity of image density | Contamination defects (stains, bands) | Image background |
| --- | --- | --- | --- | --- | --- | --- | --- |
| Ex. 1 | 20 | 80 | 100 | ○ | ○ | ○ | ○ |
| Ex. 2 | 5 | 140 | 140 | ○ | ○ | ○ | ○ |
| Ex. 3 | 6 | 50 | 52 | ○ | ◎ | ○ | ◎ |
| Ex. 4 | 10 | 80 | 190 | ○ | ○ | ◎ | ○ |
| Comp. Ex. 1 | 25 | 60 | 110 | Δ | Δ | X | X |
| Comp. Ex. 2 | 10 | 160 | 180 | X | Δ | Δ | ○ |
| Comp. Ex. 3 | 18 | 50 | 40 | X | Δ | X | X |
| Comp. Ex. 4 | 8 | 40 | 250 | Δ | X | Δ | ○ |

Characteristics of the charging members according to Examples 1 to 4 and Comparative Examples 1 to 4 were evaluated in the following testing method, and are summarized in Table 1.

<Evaluation Method>

Evaluation of Charging Uniformity (Micro Jitter)

Charging non-uniformity occurred when a charging potential difference on the surface of a charging member and the surface of a photosensitive member was non-uniform, and a fine discharge difference was generated by a foam thickness, a cell size, air permeability, and the like. Accordingly, uniformity on an image was evaluated by a dot size with the naked eye.

⊚: Good uniformity
○: Fine imbalance
Δ: Imbalance occurs (image quality is deteriorated)
x: Poor uniformity (image quality NG (no good))

Non-Uniformity of Image Density

A 100% solid tone, that is, an image density difference at a concentration of 100% coverage, was used for evaluation.

The concentration was measured at 100% patch portions with respect to five designated regions of a printed image by using a spectrophotometer (60°), and then averaging them.

The spectrophotometer was used by performing white calibration with respect to non-printed blank paper.

⊚: No occurrence (Image density difference is less than 0.10)
○: Fine occurrence (image density difference is greater than or equal to 0.10)
Δ: Slight occurrence (image quality is deteriorated, image density difference is greater than or equal to 0.15)
x: Occurrence (image quality NG; image density difference is greater than or equal to 0.20)

Contamination Defects

Whether or not stains or bands occurred on images was evaluated by the naked eye.

⊚: No occurrence
○: Fine occurrence
Δ: Slight occurrence (image quality is deteriorated)
x: Occurrence (image quality NG)

Image Background

An image was printed out, and a background thereof was examined with the naked eye and evaluated by measuring image density.

⊚: No occurrence (image density is 0)
○: Fine occurrence (image density is greater than or equal to 0.01)
Δ: Slight occurrence (image density is greater than or equal to 0.02)
x: Occurrence (image density is greater than or equal to 0.03)

Referring to Table 1, when the foam thickness was greater than or equal to 20 mm in Comparative Example 1, vertical and horizontal stains and bands occurred due to contamination of the charging member, and background defects on the image occurred over time.

In Comparative Example 2, when the cell size was greater than 150 μm, since less uniformly charged, image defects like a micro jitter occurred.

In Comparative Example 3, when the air permeability was less than or equal to 50 cc/cm$^2$/s, relatively non-uniformity charging, contamination of the charging member, and the like occurred, but in Comparative Example 4, when the air permeability was greater than or equal to 200 cc/cm$^2$/s, a concentration deviation due to non-uniform charging occurred.

According to the disclosure, an electrophotographic charging member showing excellent characteristics in terms of charging uniformity, non-uniformity of image density, contamination defects, and image background may be obtained.

As described above, those skilled in the art will recognize that various modifications and variations may be possible from the above descriptions. For example, the described techniques may be performed in a different order in addition to the described methods, and/or components of the described systems, structures, devices, circuits, materials, etc. may be connected or combined in a different form other than the described methods, or appropriate results may be achieved even if substituted with or replaced by another component or an equivalent.

Therefore, the scope of the disclosure should not be limited to the described examples, but should be defined by the claims below and equivalents thereof.

What is claimed is:

1. A charging member for an image forming apparatus comprising:
    a conductive support; and
    a surface layer on the conductive support, the surface layer being spaced apart from a photosensitive member, the surface layer comprising a urethane foam including foam cells and having a foam structure based on the foam cells, the foam cells including open cells to increase a charging uniformity of the surface layer.

2. The charging member of claim 1, wherein the urethane foam has air permeability of about 50 cc/cm2/s to about 200 cc/cm2/s.

3. The charging member of claim 1, wherein the urethane foam has air permeability of about 80 cc/cm2/s to about 200 cc/cm2/s.

4. The charging member of claim 1, wherein the urethane foam has air permeability of about 100 cc/cm2/s to about 150 cc/cm2/s.

5. The charging member of claim 1, wherein an average cell size of the foam cells in the urethane foam is less than or equal to about 150 μm.

6. The charging member of claim 1, wherein an average cell size of the foam cells in the urethane foam is less than or equal to about 100 μm.

7. The charging member of claim 1, wherein a thickness of the urethane foam is less than or equal to about 20 mm.

8. The charging member of claim 1, wherein a thickness of the urethane foam is less than or equal to about 10 mm.

9. The charging member of claim 1, wherein a volume % of the open cells is greater than or equal to about 10 volume % and less than or equal to about 70 volume % based on a total volume of the urethane foam.

10. The charging member of claim 1, wherein a volume % of the open cells is greater than or equal to about 20 volume % and less than or equal to about 70 volume % based on a total volume of the urethane foam.

11. The charging member of claim 1, wherein the conductive support comprises a metal shaft and an elastic body disposed on the metal shaft.

12. The charging member of claim 1, wherein the conductive support comprises a metal shaft and a coating layer disposed on the metal shaft.

13. The charging member of claim 1, wherein the conductive support comprises a metal shaft, an elastic body disposed on the metal shaft, and a coating layer disposed on the metal shaft.

14. A cartridge comprising:
a charging member; and
a photosensitive member, wherein
the charging member includes:
- a conductive support; and
- a surface layer on the conductive support, the surface layer comprising a urethane foam including foam cells and having a foam structure based on the foam cells, the foam cells including open cells to increase a charging uniformity of the surface layer, the cartridge is detachable from an image forming apparatus, and
the charging member is spaced apart from the photosensitive member.

15. An image forming apparatus comprising:
a charging member spaced apart from a photosensitive member, the charging member including:
- a conductive support; and
- a surface layer on the conductive support, the surface layer comprising a urethane foam including foam cells and having a foam structure based on the foam cells, the foam cells including open cells to increase a charging uniformity of the surface layer.

* * * * *